(12) United States Patent
Pink

(10) Patent No.: US 9,275,548 B2
(45) Date of Patent: Mar. 1, 2016

(54) METHOD AND DEVICE FOR DETECTING A STARTING INTENTION OF A STOPPED VEHICLE

(71) Applicant: Oliver Pink, Abstatt (DE)

(72) Inventor: Oliver Pink, Abstatt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/271,048

(22) Filed: May 6, 2014

(65) Prior Publication Data

US 2014/0336912 A1  Nov. 13, 2014

(30) Foreign Application Priority Data

May 13, 2013  (DE) .................... 10 2013 208 763

(51) Int. Cl.
| | | |
|---|---|---|
| *G08G 1/16* | (2006.01) | |
| *G01S 13/93* | (2006.01) | |
| *G08G 1/01* | (2006.01) | |

(52) U.S. Cl.
CPC ............ *G08G 1/16* (2013.01); *G08G 1/165* (2013.01); *G08G 1/167* (2013.01); *G01S 13/931* (2013.01); *G08G 1/0137* (2013.01)

(58) Field of Classification Search
CPC ..... G05D 1/00; G05D 1/0038; G05D 1/0217; G05D 1/0231; G05D 1/0227; G05D 1/0274; G01S 13/931; G08G 1/01; G08G 1/0137

USPC .......... 701/1, 2, 23–28, 93–98, 116–119, 701/300–302; 700/245, 250, 253–262; 340/901–905, 907, 933–943, 426.26, 340/463, 464, 545.3
See application file for complete search history.

(56) References Cited

U.S. PATENT DOCUMENTS

| | | | | |
|---|---|---|---|---|
| 5,166,881 | A * | 11/1992 | Akasu .............................. | 701/96 |
| 6,246,949 | B1 * | 6/2001 | Shirai et al. ..................... | 701/96 |
| 6,708,099 | B2 * | 3/2004 | Tellis et al. ..................... | 701/96 |
| 6,753,766 | B2 * | 6/2004 | Patchell ......................... | 340/436 |
| 7,366,595 | B1 * | 4/2008 | Shimizu et al. ............... | 701/301 |
| 8,615,352 | B2 * | 12/2013 | Maruyama ...................... | 701/96 |
| 2005/0137775 | A1 * | 6/2005 | Sekiguchi ....................... | 701/96 |
| 2006/0178821 | A1 * | 8/2006 | Brulle-Drews ............... | 701/209 |
| 2008/0243351 | A1 * | 10/2008 | Isogai et al. .................... | 701/96 |
| 2009/0003599 | A1 * | 1/2009 | Hart et al. ...................... | 380/209 |
| 2011/0161043 | A1 * | 6/2011 | Semmelrodt ................. | 702/141 |
| 2011/0276258 | A1 * | 11/2011 | Miyakoshi ..................... | 701/117 |
| 2012/0253549 | A1 * | 10/2012 | Cund et al. ....................... | 701/1 |
| 2013/0002874 | A1 * | 1/2013 | Negoro et al. ................. | 348/148 |
| 2014/0222280 | A1 * | 8/2014 | Salomonsson et al. ......... | 701/28 |
| 2014/0309841 | A1 * | 10/2014 | Hara et al. ...................... | 701/26 |
| 2014/0336912 | A1 * | 11/2014 | Pink .............................. | 701/117 |

\* cited by examiner

*Primary Examiner* — Thomas Tarcza
*Assistant Examiner* — Tyler J Lee
(74) *Attorney, Agent, or Firm* — Kenyon & Kenyon LLP

(57) ABSTRACT

In a method for detecting a starting intention of a stopped vehicle, a starting intention criterion is ascertained upon detection of a stopped vehicle, and decision data are formed based on the starting intention criterion, which decision data include an item of information on whether or not the stopped vehicle will start.

10 Claims, 3 Drawing Sheets

METHOD AND DEVICE FOR DETECTING A STARTING INTENTION OF A STOPPED VEHICLE

BACKGROUND OF THE INVENTION

1. Field of the Invention

The present invention relates to a method, a computer program and a device for detecting a starting intention of a stopped vehicle.

2. Description of the Related Art

Driver assistance systems which are able to automatically stop behind other vehicles and restart are known per se. However, these driver assistance systems are primarily intended for use on freeways, i.e., without stationary traffic.

The drawback of the known driver assistance systems is in particular that these are not able to distinguish between a parked and a briefly stopped vehicle. A known driver assistance system would thus automatically stop behind a parked vehicle and carry out a bypass maneuver either never or at least only after a time period. This costs time. If the engine of the vehicle should still be running during the waiting period, this also costs additional energy in the form of fuel and/or electrical energy.

BRIEF SUMMARY OF THE INVENTION

It is thus an object of the present invention to provide a method and a device for detecting a starting intention of a stopped vehicle, which overcome the known drawbacks and allow a distinction between a parked and a briefly stopped vehicle.

It is another object of the present invention to provide a corresponding computer program.

It is another object of the present invention to provide a corresponding driver assistance system.

According to one aspect, a method for detecting a starting intention of a stopped vehicle is provided, a starting intention criterion being ascertained upon detection of a stopped vehicle, and decision data being formed based on the starting intention criterion, which include a piece of information on whether or not the stopped vehicle will start.

According to yet another aspect, a device for detecting a starting intention of a stopped vehicle is provided, the device including an ascertainer for ascertaining a starting intention criterion upon detection of a stopped vehicle and a decider for forming decision data based on the starting intention criterion, which include a piece of information on whether or not the stopped vehicle will start.

According to yet another aspect, a driver assistance system for a vehicle is provided, the driver assistance system including the device for detecting a starting intention of a stopped vehicle, the driver assistance system further including a control unit for controlling the vehicle based on the decision data.

According to one further aspect, a computer program is provided, which includes program code for carrying out the method for detecting a starting intention of a stopped vehicle if the computer program is executed in a computer, in particular in a control unit.

The present invention thus in particular includes the idea to decide, based on a starting intention criterion, whether or not the stopped vehicle will start. For this purpose, decision data which include this information are advantageously generated or formed. By providing such decision data, it is advantageously made possible in particular to control the host vehicle at least automatically, in particular fully automatically. For example, the host vehicle may carry out a bypass maneuver to bypass the stopped vehicle. This applies in particular when a decision was made that the stopped vehicle will not start. In general, it is then possible and reasonable to safely bypass the stopped vehicle.

However, if it was decided based on the starting intention criterion that the stopped vehicle will start, in general no bypass maneuver is carried out, since, on the one hand, it is no longer absolutely necessary and, on the other hand, it could involve needless risk.

By providing the decision data, advantageously a behavior decision of the driver assistance system, which in particular may be designed as a system for highly automated driving, may advantageously be improved. This is the case since, based on the decision data, it is possible to initiate a suitable maneuver, i.e., one which is adapted to the concrete situation, already at a very early stage, i.e., in time. For example, it is advantageously made possible to detect that the stopped vehicle is a parked vehicle, which will not start. The host vehicle will thus not wait unnecessarily behind the stopped vehicle for a long time period, but will carry out a suitable bypass maneuver immediately or only with a very short delay. This results in particular in considerable time savings. Moreover, it may result in particular in fuel savings and/or in savings of electrical energy, depending on whether the vehicle has an electric motor and/or an internal combustion engine.

The decision data, i.e., the detection that the stopped vehicle will or will not start, is formed in particular based on the starting intention criterion, preferably based on multiple starting intention criteria which may preferably be identical or in particular may be different. This starting intention criterion is in particular a criterion of whether or not the stopped vehicle will start with a predetermined probability.

According to one specific embodiment, multiple starting intention criteria are formed, which are weighted. This means in particular that the starting intention criteria may be provided with a weighting factor. It is then advantageously possible to form a weighted starting intention criterion based on the weighted starting intention criteria. The corresponding decision data are then formed based on the weighted starting intention criterion. By providing the weighting factors, a very concrete situation may be individually addressed, so that the final decision as to whether or not the stopped vehicle will restart may be made particularly reliably.

For a clear distinction between the stopped vehicle and the vehicle which is approaching the stopped vehicle and which is now to detect whether or not the stopped vehicle will start, the vehicle approaching the stopped vehicle is referred to as the host vehicle.

According to one specific embodiment, a scan is carried out for stopped vehicles. This means in particular that a scan is carried out for stopped vehicles in the surroundings of the host vehicle. If a stopped vehicle is detected or recognized, a starting intention criterion is ascertained. Decision data are formed based on the starting intention criterion. These decision data include in particular a piece of information on whether or not the stopped vehicle will start.

For example, according to one specific embodiment, these decision data may then advantageously be made available to a control unit of a driver assistance system. The control unit may then control the vehicle at least automatically, preferably fully automatically, preferably based on the decision data.

According to one specific embodiment, it may be provided that a bypass maneuver is carried out when the decision data include the information that the vehicle will not start. This means in particular that in this case the host vehicle will then bypass the stopped vehicle.

If the decision data include the information that the vehicle will start, the control unit will in particular decelerate the host vehicle and stop it, if necessary. It is then possible to advantageously wait until the stopped vehicle has restarted.

According to one specific embodiment, it may be provided that the information is formed as binary information. This means in particular that the decision as to whether or not the stopped vehicle will start is a binary decision regarding one of the two states that are starting or not starting.

According to another specific embodiment, it may be provided that the information includes a predetermined probability. This means in particular that the decision as to whether or not the vehicle will start has this probability. This means in particular that the two possible states, i.e., starting or not starting, of the stopped vehicle are indicated with a predetermined probability.

According to one specific embodiment, it may be provided that a stop time of the stopped vehicle is measured, during which the vehicle does not move, the starting intention criterion being ascertained based on the measured stop time.

This means in particular that a movement history of the stopped vehicle is ascertained, for example. The longer a vehicle is generally stopped, the less likely is it that it will be restarted. Measuring the stop time of the stopped vehicle is thus a particularly suitable starting intention criterion to make a decision as to whether or not the stopped vehicle will start. In particular it may be provided that the measured stop time is compared to a predetermined stop time threshold value. A decision may then be made as a function of this comparison as to whether or not the stopped vehicle will restart. This means in particular that the decision data include the information that the stopped vehicle will not start if the measured stop time is greater than the predetermined stop time threshold value.

According to one further specific embodiment, it may be provided that a lateral distance between the stopped vehicle and the shoulder is measured if the stopped vehicle stops on a roadway including a traffic lane and a shoulder.

In general, it is true that a stopped vehicle which will not restart is standing closer to the shoulder than a stopped vehicle which will restart. Measuring the lateral distance between the stopped vehicle and the shoulder is thus also a particularly suitable starting intention criterion.

According to one specific embodiment, it may be provided that the shoulder includes a curb and the lateral distance from the curb is measured.

Once again, it is generally true that a standing or stopped vehicle which will not restart is standing closer to a curb than a stopped vehicle which will restart.

According to one specific embodiment, it may be provided that a position of a tire of the stopped vehicle relative to the shoulder is ascertained. In particular, if it is established here that the tire is situated on the shoulder, this is a strong indication that the stopped vehicle will not start. Corresponding decision data may thus preferably be formed.

According to one further specific embodiment, it may be provided that a position of a tire of the stopped vehicle relative to the curb is detected. In particular, if it is established here that the tire is situated on the curb, this is generally a strong indication that the stopped vehicle will not start. In particular, corresponding decision data may thus be formed.

According to yet another specific embodiment, it may be provided that a particular position of multiple tires of the stopped vehicle relative to the shoulder and/or relative to the curb is/are detected. The specific embodiments provided in connection with one tire apply analogously to specific embodiments using multiple tires, and vice versa.

According to one further specific embodiment, it may be provided that an operating state of a vehicle lighting system of the stopped vehicle is detected, the starting intention criterion being ascertained based on the detected operating state.

A vehicle lighting system will generally be turned off if the stopped vehicle is a parked vehicle which will not start in the foreseeable future. By detecting the corresponding operating state of the vehicle lighting system, it is thus easily possible to ascertain a starting intention criterion to be able to make a decision as to whether or not the stopped vehicle will start.

A vehicle lighting system within the sense of the present invention may include in particular the following lighting systems: high beam, low beam, side light (also referred to as side marker light), parking light, turn signal, fog light, swiveling headlights, long-range driving light, daytime running light, front emergency lights, license tag lighting, rear lighting such as tail lights, brake lights, turn signals, reflectors, license plate lighting, rear fog lights, back-up lights and side marker lights.

For example, active brake lights are an indication that the stopped vehicle is still ready to drive. Thus, the vehicle may still start. However, if it is simultaneously detected, for example, that a turn signal to the right is active, i.e., a right-hand turn signal is activated, this is an indication that the stopped vehicle has no intention of starting soon. In such a case, the stopped vehicle would activate the left turn signal. If, in particular, both the brake lights and the turn signal are turned off, it generally involves a parked vehicle, which will not start.

One operating state of the vehicle lighting system includes in particular an active operating state in which the vehicle lighting system is turned on or active. The operating state includes in particular a deactivated operating state in which the vehicle lighting system is deactivated or turned off.

According to yet another specific embodiment, it may be provided that a position of a vehicle door of the stopped vehicle is detected, the starting intention criterion being ascertained based on the detected position.

The position of the vehicle door may be in particular an open position, in which the vehicle door is open. For example, the position may be a closed position in which the vehicle door is closed. In particular, a particular position of multiple vehicle doors is detected, the starting intention criterion then being ascertained based on the corresponding detected positions. A vehicle door may include a trunk lid and/or an engine hood, for example. In particular, the vehicle door includes a door through which persons may enter or exit the vehicle, such as the driver's door.

In general, a vehicle which has one or multiple vehicle doors open will not start. A vehicle which has closed doors may be a vehicle which will restart. This means in particular that a suitable starting intention criterion for the decision data may be ascertained by detecting the corresponding position of the vehicle door.

According to one further specific embodiment, it may be provided that a scan is carried out for entering or exiting persons. Exiting or entering persons are generally a strong indication that the vehicle will not restart. This applies in particular if the driver of the stopped vehicle was able to be detected or observed while exiting.

According to yet another specific embodiment, it may be provided that a scan is carried out for vehicle occupants of the stopped vehicle. This means in particular that a scan is carried out as to whether persons are situated in the stopped vehicle. If this is not the case, the vehicle is generally not able to restart. The accordingly formed decision data then include in particular the information that the stopped vehicle will not restart.

According to one further specific embodiment, it may be provided that a thermal image of the stopped is recorded, the starting intention criterion being ascertained based on the recorded thermal image.

For example, it is advantageously possible in particular with the aid of the recording of the thermal image to detect a temperature of an exhaust gas system and/or of a drive engine and/or of brake disks of the stopped vehicle. Based on the measured or detected temperatures, a statement may then preferably be made as to whether or not the stopped vehicle was still moved recently. In general, a vehicle which has not moved for an extended period will have an engine temperature, an exhaust gas system temperature and/or a brake disk temperature which is lower than a corresponding temperature of a vehicle which recently, i.e., immediately prior to the measurement of the temperatures or prior to the recording of the thermal image, was still moving. A particularly reliable statement may thus be made as to how long the vehicle has not moved. In particular, a stop time of the stopped vehicle may be determined.

According to one further specific embodiment, it may be provided that the starting intention criterion is ascertained based on data of the vehicle surroundings which describe the surroundings of the stopped vehicle.

This means in particular that the surroundings of the stopped vehicle are considered or used for the decision as to whether or not the stopped vehicle will start.

For example, if further vehicles are standing ahead of the stopped vehicle, this may indicate in particular that the stopped vehicle itself is waiting for the vehicles situated ahead of it to restart. This means in particular that the stopped vehicle will restart soon.

However, if no further vehicles are standing ahead of the stopped vehicle, i.e., if it is a single standing vehicle, this is a strong indication that the stopped vehicle is a parked vehicle. Such a vehicle will generally not restart.

The data of the vehicle surroundings may include digital map data, for example. The data of the vehicle surroundings may preferably include surroundings sensor data of one or multiple surroundings sensors. This means in particular that the surroundings of the stopped vehicle are detected with the aid of one surroundings sensor or with the aid of multiple surroundings sensors. In particular, the surroundings of the stopped vehicle may be described with the aid of the digital map data.

Surroundings sensors may include LIDAR sensors, video sensors, infrared sensors, ultrasonic sensors and/or radar sensors, for example. The surroundings sensors may be identical, for example, or preferably different. This means in particular that it may be provided according to one specific embodiment that one such surroundings sensor is provided, or such surroundings sensors are provided. This means in particular that the device and/or the driver assistance system may include such sensors.

For example, in the vicinity of intersections, crosswalks, in particular when pedestrians are present, and/or stop lights, also referred to as traffic signals, in particular with red stop lights, a restarting of the stopped vehicle is more likely to be expected than on an open road. In the vicinity of intersections, in particular in turn lanes, an engaged turn signal, i.e., an active turn signal, is generally not a suitable indicator for a restarting intention of the stopped vehicle. A parked vehicle is less likely in no-standing zones, or immediate restarting is accordingly more likely. Conversely, designated parking bays are generally indications of stationary traffic. The vehicle will thus generally not start. Moreover, a road category is also an indicator of a stopping or restarting intention, depending on the rank of the road. This means in particular that the higher the rank of the road, the less likely are parked vehicles and the probability for restarting is accordingly higher. For example, a traffic-calmed street, such as a play street, has a lower rank than a federal highway, a country road or a freeway.

This means in particular that the above-mentioned exemplary situations are specifically detectable with the aid of the vehicle surroundings data, so that then decision data as to whether or not the stopped vehicle will start may be formed accordingly.

The comments made in connection with the device apply analogously to specific embodiments in connection with the method and with the driver assistance system, and vice versa.

Specific embodiments which correspond to the method in particular result in specific embodiments which correspond to the device and to the driver assistance system, and vice versa.

The present invention is described in greater detail hereafter based on preferred exemplary embodiments.

DETAILED DESCRIPTION OF THE INVENTION

Figure 1:
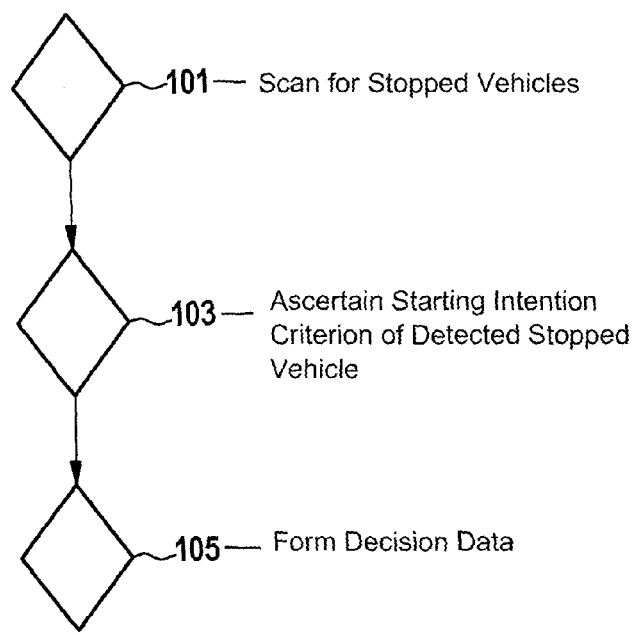
FIG. 1 shows a flow chart of a method for detecting a starting intention of a stopped vehicle.

Hereafter, identical reference numerals may be used for identical features.

FIG. 1 shows a flow chart of a method for detecting a starting intention of a stopped vehicle.

According to a step 101, a scan is carried out for stopped vehicles. This means in particular that a scan is carried out for stopped vehicles in the surroundings of the host vehicle.

If a stopped vehicle is recognized or detected, a starting intention criterion is ascertained in a step 103. According to a step 105, decision data are then formed based on the starting intention criterion. These decision data include in particular a piece of information on whether or not the stopped vehicle will start.

For example, these decision data may then advantageously be made available to a control unit of a driver assistance system. The control unit may then control the vehicle at least automatically, preferably fully automatically, preferably based on the decision data. In particular, it may be provided that a bypass maneuver is carried out when the decision data include the information that the vehicle will not start. This means in particular that in this case the host vehicle will then bypass the stopped vehicle.

If the decision data include the information that the vehicle will start, the control unit will decelerate the host vehicle and stop it, if necessary. It is then possible to advantageously wait until the stopped vehicle has restarted.

Figure 2:
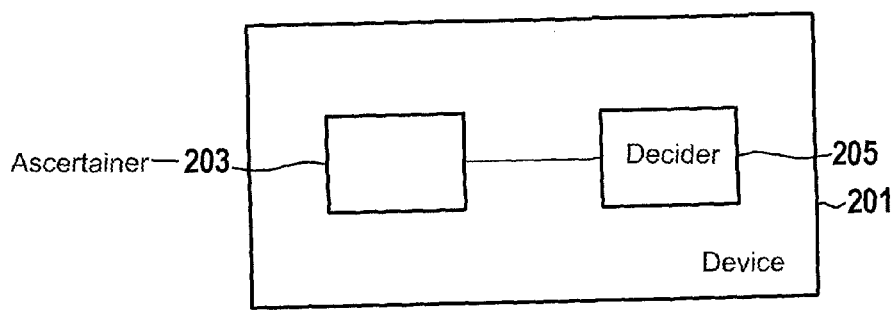
FIG. 2 shows a device for detecting a starting intention of a stopped vehicle.

FIG. 2 shows a device 201 for detecting a starting intention of a stopped vehicle (not shown).

Device 201 includes an ascertainer 203 for ascertaining a starting intention criterion upon detection of a stopped vehicle. Device 201 further includes a decider 205, which is designed to form decision data based on the starting intention criterion. The decision data include a piece of information on whether or not the stopped vehicle will start.

For example, the ascertainer may include one or multiple surroundings sensors.

Figure 3:
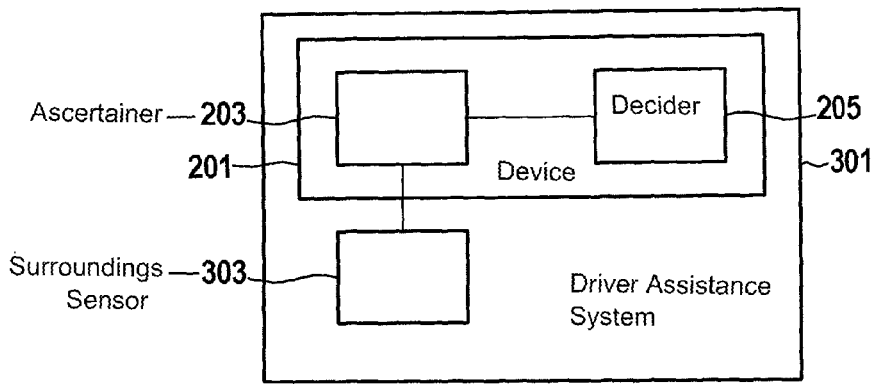
FIG. 3 shows a driver assistance system.

FIG. 3 shows a driver assistance system 301 for a vehicle (not shown).

Driver assistance system 301 includes device 201 according to FIG. 2. Driver assistance system 301 further includes a surroundings sensor 303 for detecting surroundings of the stopped vehicle by sensors. For example, it may be detected whether the stopped vehicle is situated at an intersection, at a crosswalk, at a stop light or in a parking bay. In particular if the surroundings sensor is designed as a thermal or infrared sensor, a thermal image of the stopped vehicle is detectable. As an alternative or in addition to surroundings sensor 303, a navigation system may be provided, which may include in particular a digital map. Based on digital map data of the digital map of the navigation system, it is also advantageously possible to detect where exactly the stopped vehicle is situated, i.e., for example in the vicinity of intersections, crosswalks, stop lights or in a parking bay.

Figure 4:
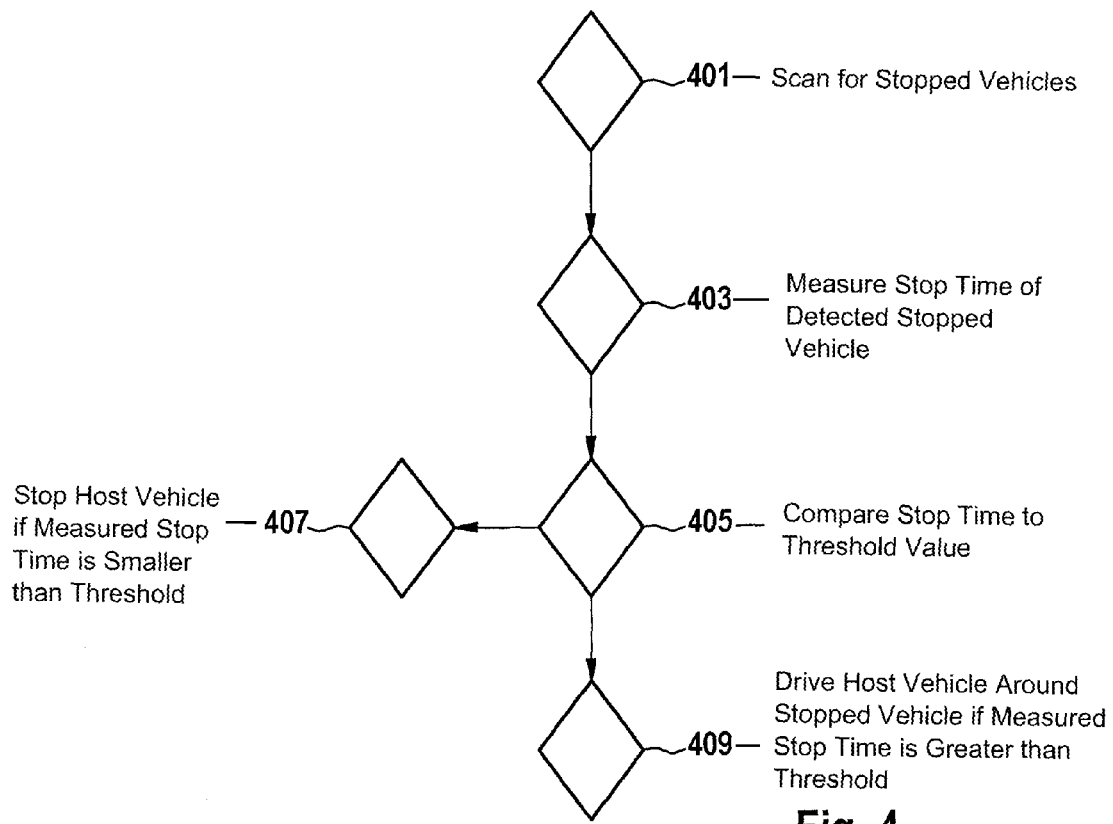
FIG. 4 shows a flow chart of a further method for detecting a starting intention of a stopped vehicle.

FIG. 4 shows a flow chart of a further method for detecting a starting intention of a stopped vehicle.

According to a step 401, a scan is carried out for stopped vehicles. This means in particular that the host vehicle carries out a scan for stopped vehicles in its surroundings. If such a stopped vehicle was detected or recognized in the surroundings of the host vehicle, according to a step 403 a stop time is measured, during which the stopped vehicle does not move, while the host vehicle is approaching the stopped vehicle.

In a step 405, the measured stop time is compared to a stop time threshold value. If it is established in step 405 that the measured stop time is smaller than the predetermined stop time threshold value, according to a step 407 the host vehicle is stopped behind the stopped vehicle. The probability is then high that the stopped vehicle is a vehicle that will soon restart.

If it is established in step 405 that the measured stop time is greater than the predetermined stop time threshold value, according to a step 409 the host vehicle is driven around the stopped vehicle. Thus, a bypass maneuver is carried out. In this case, the measured stop time indicates that the stopped vehicle is a parked vehicle, which will generally not start immediately.

Figure 5:
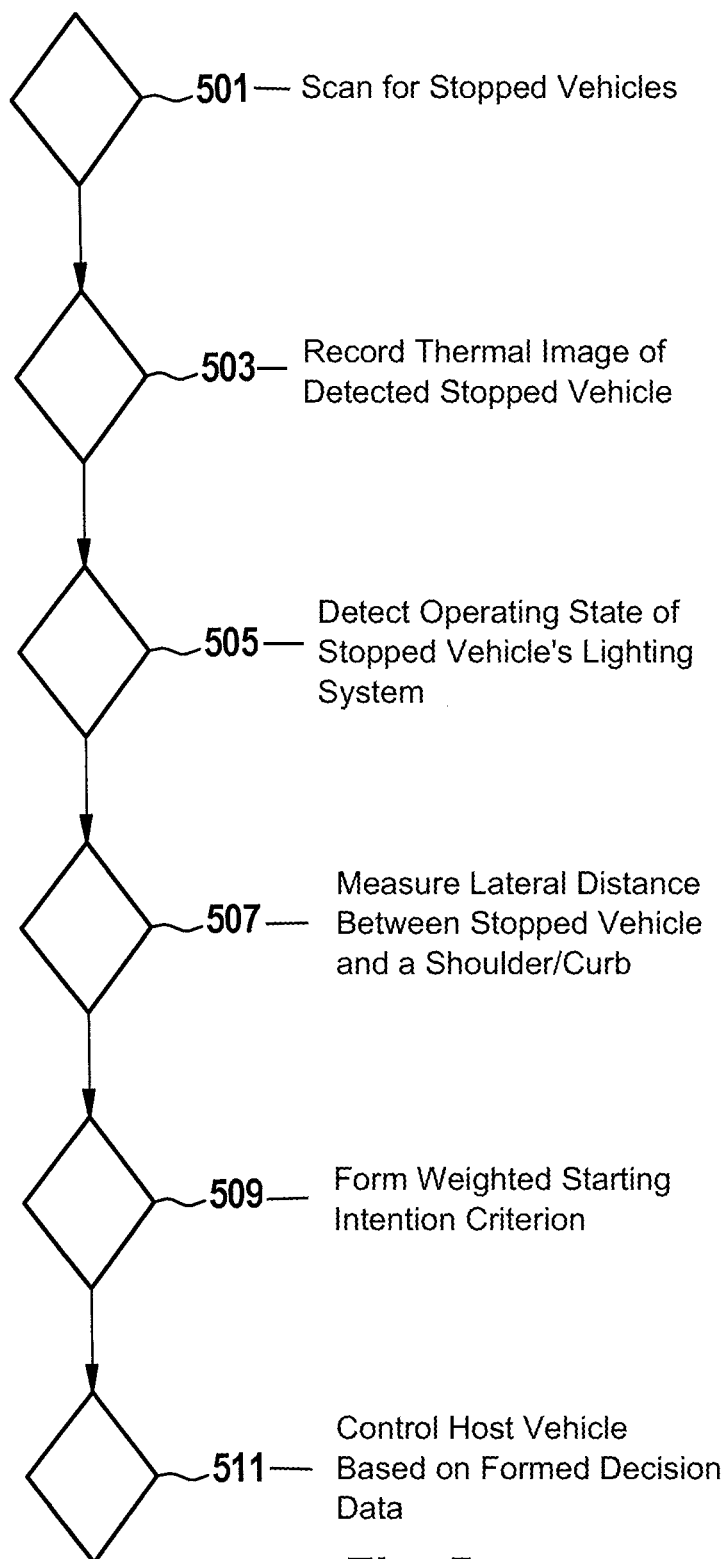
FIG. 5 shows a flow chart of another method for detecting a starting intention of a stopped vehicle.

FIG. 5 shows a flow chart of a further method for detecting a starting intention of a stopped vehicle.

According to a step 501, a scan is carried out for stopped vehicles. This means in particular that the host vehicle carries out a scan for stopped vehicles in its surroundings.

If a stopped vehicle was detected in the surroundings of the host vehicle, according to a step 503 a thermal image of the stopped vehicle is recorded. Based on the recorded thermal image, corresponding decision data are then formed, which include a piece of information on whether or not the stopped vehicle will start. This is done in particular as a function of the temperatures of the stopped vehicle which are extracted from the thermal image of the stopped vehicle. In general, for example, an engine temperature which is only marginally, e.g., a few degrees, above an ambient temperature of the stopped vehicle indicates that the vehicle has not been moved in quite some time. In such a case, this involves in particular a parked vehicle which will generally not start immediately.

According to a step 505, an operating state of a vehicle lighting system of the stopped vehicle is detected, the starting intention criterion then being ascertained based on the detected operating state. Corresponding decision data are then formed in particular based on this starting intention criterion. For example, an activated brake light would indicate that the stopped vehicle is still ready to drive and could thus start at any time.

According to a step 507, a lateral distance between the stopped vehicle and a shoulder and/or a curb is measured. Based thereon, a starting intention criterion is then ascertained and corresponding decision data are formed.

According to a step 509, a weighted starting intention criterion is then formed which is based on the above-mentioned starting intention criterion, the individual starting intention criteria here being provided with a corresponding weighting factor or a corresponding weighting. In general, for example, an active brake light is a stronger indication that the vehicle will start than a particularly close lateral distance of the stopped vehicle from the curb or from the shoulder.

Due to weighting, it is thus advantageously possible to achieve that the decision whether or not the stopped vehicle will start may be made particularly reliably. Decision data may then be formed based on the weighted starting intention criterion.

According to a step 511, the host vehicle will then be controlled in accordance with the decision data formed based on the weighted starting intention criterion.

In one specific embodiment, which is not shown, it may be provided that the decision data formed in steps 503, 503 and 507 are merged, so that the vehicle is controlled based on these merged decision data.

In summary, the present invention thus includes in particular the idea of distinguishing between a parked vehicle, i.e., one which is stopped for a longer period, and a briefly stopped vehicle, such as at an intersection. This is carried out in particular as a function of a starting intention criterion, which may include, for example, a stop time, a lateral distance of the vehicle from the shoulder and/or from the curb, an operating state of a vehicle lighting system, a position of a vehicle door, a thermal image, [or] a detected number of vehicle occupants. Based on these criteria, decision data may be formed accordingly, which may preferably be weighted, the decision data possibly including a piece of information on whether or not the stopped vehicle will start. A driver assistance system is then able to control the vehicle accordingly based on these decision data.

What is claimed is:

1. A method for detecting a starting intention of a stopped vehicle distinct from a host vehicle, comprising:
    detecting, with a sensor, the stopped vehicle;
    ascertaining, with a processor of the host vehicle, a starting intention criterion upon detection of the stopped vehicle, wherein a stop time of the stopped vehicle is measured, during which stop time the vehicle does not move, and wherein the starting intention criterion is ascertained based on the measured stop time;
    forming, with the processor, decision data based on the starting intention criterion, wherein the decision data include an item of information regarding whether or not the stopped vehicle will start; and
    controlling, with the processor, the host vehicle based on the decision data.

2. The method as recited in claim 1, wherein, if the stopped vehicle stops on a roadway including a traffic lane and a shoulder, a lateral distance between the stopped vehicle and the shoulder of the roadway is measured.

3. The method as recited in claim 2, wherein the shoulder includes a curb, and the lateral distance from the curb is measured.

4. The method as recited in claim 1, wherein an operating state of a vehicle lighting system of the stopped vehicle is detected, and the starting intention criterion is ascertained based on the detected operating state of the vehicle lighting system.

5. The method as recited in claim 1, wherein a position of a vehicle door of the stopped vehicle is detected, and the starting intention criterion is ascertained based on the detected position of the vehicle door.

6. The method as recited in claim 1, wherein a thermal image of the stopped vehicle is recorded, and the starting intention criterion is ascertained based on the recorded thermal image.

7. The method as recited in claim 1, wherein the starting intention criterion is ascertained based on data of the vehicle surroundings which describe surroundings of the stopped vehicle.

8. A driver assistance system for a host vehicle, comprising:
- a device for detecting a starting intention of a stopped vehicle distinct from the host vehicle, the device including:
- an ascertainer for ascertaining a starting intention criterion upon detection of a stopped state of the stopped vehicle, wherein a stop time of the stopped vehicle is measured, during which stop time the vehicle does not move, and wherein the starting intention criterion is ascertained based on the measured stop time;
- a decider for forming decision data based on the starting intention criterion, wherein the decision data include an item of information on whether or not the stopped vehicle will start; and
- a control unit for controlling the host vehicle based on the decision data.

9. The driver assistance system as recited in claim 8, further comprising a control unit for controlling the vehicle based on the decision data.

10. A non-transitory, computer-readable data storage medium storing a computer program having program codes which, when executed on a computer, performs a method for detecting a starting intention of a stopped vehicle distinct from a host vehicle, the method comprising:
- detecting the stopped vehicle;
- ascertaining a starting intention criterion upon detection of the stopped vehicle, wherein a stop time of the stopped vehicle is measured, during which stop time the vehicle does not move, and wherein the starting intention criterion is ascertained based on the measured stop time;
- forming decision data based on the starting intention criterion, wherein the decision data include an item of information regarding whether or not the stopped vehicle will start; and
- controlling the host vehicle based on the decision data.

* * * * *